United States Patent Office 2,866,042
Patented Dec. 23, 1958

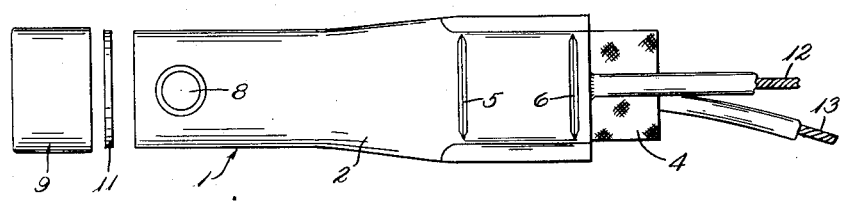
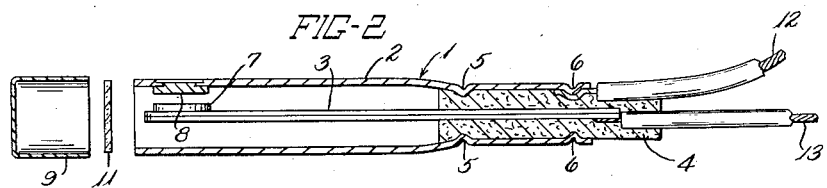
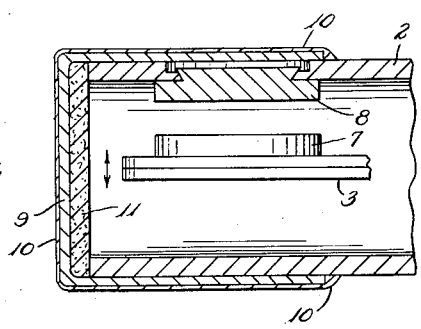

2,866,042

THERMOSTAT HAVING END CAP THEREON

Russell L. Schwing, Akron, Ohio, assignor to Mechanical Industries Production Company, Akron, Ohio, a corporation of Ohio Application November 12, 1957, Serial No. 695,755

2 Claims. (Cl. 200—138)

This invention relates to thermostats, especially to a thermostat having a bimetallic strip therein and having an end cap on one end of the thermostat casing. The bi-metal strip moves with appropriate temperature change to control an electric circuit.

Heretofore there have been various different types of thermostats provided and one style of a thermostat, over which the present invention is an improvement, is the thermostat shown in United States Letters Patent No. 2,586,309, wherein the outer end of a bimetallic strip is clamped or secured to one end of the thermostat casing and extends axially inwardly of the casing as a cantilever. The inner end of the bimetallic strip carries a contact for completing a circuit with a contact carried by the case and the bimetallic strip may move under influence of temperature to open or close the circuit at a desired temperature. The casing of such a thermostat is usually made of conductive metal tubing and clearance must be provided for movement of the bimetallic strip. Usually the metal tubing is closed adjacent the cantilever end of the strip by flattening of the tubing. Such flattening necessitates greater length of tubing to provide space for movement of the strip and to provide a sealed end. Obviously, one needs some appreciable cantilever length in the bimetal strip in order for it to have the required arcuate movement in the thermostat with different temperature conditions existing thereon so that the desired electrical control can be provided. The thermostats are set to a desired calibration so that they will operate within predetermined temperature ranges.

It should be understood that thermostat units are in many instances used in small electrical appliances and in very small electric motors, or in electric blankets, or in other electrical units wherein it is highly desirable that a compact thermostat unit be provided, but with the thermostat still providing desirable and accurate control action for the desired temperature ranges for the circuits in which the thermostats are used.

It thus is the general object of the present invention to provide a novel and improved thermostat unit characterized by the compactness of the thermostat unit and by an end cap provided thereon.

Another object of the invention is to provide a thermostat unit with only one bimetal strip and movable contact therein and with a conductive thermostat casing having an end cap secured over an open end portion thereof opposite to the end portion anchoring the bimetal strip in the casing.

A further object of the invention is to provide a compact thermostat unit wherein the length of the thermostat is determined by one bimetal strip positioned as a cantilever within the casing of the thermostat and with a stationary contact being carried on the conductive casing of the thermostat.

Yet another object of the invention is to provide a thermostat having two relatively movable contacts immediately adjacent one open end portion thereof and with an insulated end cap being provided to close such end of the casing.

A further object of the invention is to provide a compact thermostat unit having a very short length, and having a capped closed end that may be hermetically sealed.

The foregoing and other objects and advantages of the invention will be made more apparent as the specification proceeds.

Reference now should be had to the accompanying drawings wherein:

Fig. 1 is a top plan of the thermostat of the invention with the end cap and insulating disc being shown in exploded relation to the remainder of the thermostat;

Fig. 2 is a vertical sectional view taken of the thermostat unit of Fig. 1 with the end cap and insulation disc shown in exploded relation to the remainder of the thermostat elements; and Fig. 3 is an enlarged vertical section through the open end portion of the casing of the thermostat unit of the invention after the end cap and insulation means are assembled thereon.

When referring to corresponding parts shown in the specification and referred to in the drawings, corresponding numerals are used to facilitate comparison therebetween.

In general, the present invention relates to a thermostat that includes a conductive casing, a bi-metal strip secured at one portion thereof to an end portion of the casing in insulated relation thereto, which bi-metal strip has a cantilever section extending into the casing from the secured or anchored portion thereof, contact means carried by the casing in the cantilever section of the bi-metal strip in opposed relation adjacent the other and open end of the casing, a cap secured over such other end of the casing, and normally insulating and sealing means over the end of the casing inside of said end cap to prevent any shorting or arcing currents flowing through the end cap means from the contact means.

In regards to the details of the structure shown in the accompanying drawings, a thermostat 1 is shown and it includes a casing 2 normally formed from some good electrically conductive metal, such as copper, aluminum, brass or the like. A bi-metal contact strip 3 is secured in the casing 2 and extends into the center portion thereof. This bi-metal strip 3 is insulated from the casing 2 by a conventional insulation means 4. This insulation means may comprise a strip or tube of silicon-impregnated glass fabric, for example, which encompasses the strip 3 and which is clamped around such strip by compressing or flattening the casing 2 in an end portion thereof. Usually such flattening or compacting of one of the ends of the casing 2 is provided by forming stakes 5 and 6 at transversely extending, axially spaced sections of the casing, which stakes 5 and 6 effectively and tightly anchor or secure one end portion of the bi-metal strip 3 so that the remainder thereof extends as a cantilever into the casing 2.

Suitable contacts 7 and 8 are secured to the free end portion of the bi-metal strip 3 and to the casing 2, respectively, so that such contacts 7 and 8 are positioned in opposed relation. Arcuate movement of the bi-metal strip 3 occurs under the various temperature conditions to which it is subjected to cause these contacts 7 and 8 to be brought into electrical contact or engagement with each other, or to be spaced apart, as desired, by the inherent operative properties of the thermostat 1 of the invention.

The casing 2 may be tubular in shape and have a generally oval shape in cross section, and the contacts 7 and 8, for example, may either have flat or rounded surfaces, or one may be flat and one may be rounded, as desired, Preferably one end of the casing 2 is left open and it is of generally tubular shape in section, which open end is opposite to that to which the strip 3 is anchored. A suitable cap 9 is provided for enclosing such open end of the casing 2. The cap 9 normally is made from conductive metal like the remainder of the casing 2 and with such cap 9 being secured, as by solder 10 to the remainder of the casing. The solder 10 may be positioned on the cap and associated portions of the casing by, for example, dipping the end cap and casing assembly into molten solder. This effectively bonds the cap 9 and casing 2 together and closes the casing end. In order to avoid any of the solder 10 running down between the associated surfaces of the casing 2 and end cap 9 to a point within the casing, insulation means, such as an insulation disc 11, which may be made from asbestos or other heat resistant material, is secured by the end cap 9 over the open end of the casing 2. The end cap is usually forced tightly against the end of the casing 2 when soldered thereto and this effectively positions the disc 11 in place. The inner surface of the cap 9 may have other insulation means provided thereon, if desired.

The insulation disc 11 has a second a second function in the thermostat 1 and that is to prevent arcing currents from the contacts 7 and 8 from passing to and through the end cap 9.

The thermostat 1 of the invention normally has suitable terminals or leads connected thereto and in this instance, a pair of leads 12 and 13 are shown. The lead 12 is suitably bonded to the casing 2 and the lead 13 is secured, as by spot welding, or soldering, it to one end portion of the bimetal strip 3. The casing 2 may be made of any desired length.

In the thermostat 1 of the invention, it will be seen that the bi-metal strip 3 extends substantially the entire length of the thermostat 1 and with a major portion of the bi-metal strip 3 being positioned as a cantilever within the casing. By leaving a relatively long cantilever bimetal strip length in relation to the overall lentgh of the thermostat 1, the thermostat 1 will have desirable operational and control characteristics. Thus, the thermostat 1 may have any conventional properties and with the thermostat 1 being adapted to make or break electrical circuits depending upon the temperatures to which the thermostat 1 is subjected and the design of the thermostat. The casing 2 may be made to extend at a slight angle with relation to the end portion thereof between the staked sections 5 and 6 therein and this will aid in determining the operating characteristics of such thermostat. Thus, the thermostat 1 of the invention is a compact, but effective unit and with a novel end closure being provided on this thermostat 1 of the invention. Thus it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. A thermostat comprising a seamless tubular conductive metal casing, a bimetal strip extending axially into said casing from one end thereof to a position close to the opposite end thereof and clamped at said one end of the casing to the casing in sealed relation thereto by a tubular body of insulating material therebetween, said bimetal strip having beyond its clamped portion a cantilever portion extending toward the opposite end of the casing in spaced relation to the casing, contact means conductively secured to a wall of the casing near said opposite end, a second contact means conductively mounted on the cantilever portion of said bimetal strip for make and break contact with the first contact means closely adjacent said opposite end of the casing, a metal cap telescopically positioned over the opposite end of said casing and secured thereto by solder to close the casing, insulation means positioned across the open end of the casing within said cap closely adjacent the cantilever end of said bimetal strip to prevent arcing and insulate the contacts from heat radiation through said cap, and terminal means conductively and directly connected to said casing and said bimetal strip.

2. A thermostat including an electrically conductive casing of metal tubing, a bimetal strip extending axially into said casing from one end thereof to a position close to the opposite end thereof, tubular insulation means encompassing the bimetal strip at said one end of the casing, said casing being compressed at said one end to clamp said insulation means about said bimetal strip to position said bimetal strip and seal said one end of the casing, said bimetal strip having a cantilever portion extending axially from said insulation means to a position near said opposite end of the casing, contact means conductively secured to a wall of the casing near said opposite end thereof, a second contact means conductively mounted on the end of the cantilever portion of said bimetal strip for make and break contact with the first said contact means closely adjacent the opposite end of the casing, a metal cap telescopically secured over the open opposite end of said casing and soldered thereto, and an insulation disc secured over the open end of said casing and said cap positioning said insulation disc against the end of the casing in spaced relation to the free end of said bimetal strip to prevent arcing to said cap and heat transfer from said cap to said strip.

References Cited in the file of this patent

UNITED STATES PATENTS

| | | |
|---|---|---|
| 2,586,309 | Dales | Feb. 19, 1952 |
| 2,627,003 | Porter | Jan. 27, 1953 |
| 2,745,924 | Coates | May 15, 1956 |
| 2,773,962 | Perst | Dec. 11, 1956 |